Dec. 21, 1965     L. J. A. EMARD     3,224,133

FISHING LURE

Filed March 18, 1964

LEON J. A. EMARD.
INVENTOR.

BY *Karl F. Ross*

AGENT

United States Patent Office 3,224,133
Patented Dec. 21, 1965

3,224,133
FISHING LURE
Leon Joseph Arsène Emard, 3 Rue d'Orléans,
Nantes, Loire-Atlantique, France
Filed Mar. 18, 1964, Ser. No. 352,735
Claims priority, application France, Jan. 21, 1964,
44,375, Patent 85,156
1 Claim. (Cl. 43—42.04)

The object of the present invention is a fishing lure, the body of which is freely mounted on the central rod and is made of a longitudinally compressible and resilient material, in a manner such that said body may be compressed longitudinally and slide along said rod when, after the fish has bitten and gripped the lure in its mouth, a pull is exerted by the line on said rod and thus on the hook or hooks.

When the lure consists of a spoon, the body is constituted by a sheath of rubber or flexible and resilient plastic material or by a helical spring of metal or plastic material, said sheath or said spring being mounted with a transverse clearance on the rod carrying the blade or blades, the stirrup or stirrups and the balls, which rod has at each end a securing eye for the hook and for the line respectively.

In the case of a lure simulating an artificial fish, the body is made of at least one helical strip connecting together a head and a tail movably mounted on the rod terminating with the hook, or else, according to a modification, the portion of the body of the artificial fish between the head and the tail has a concertina-like outline.

The invention will be clearly understood, anyway, from the following description, with reference to the appended diagrammatic drawings which illustrate, by way of non-limiting examples, four embodiments of the lure of the invention. In said drawings.

Figure 1:
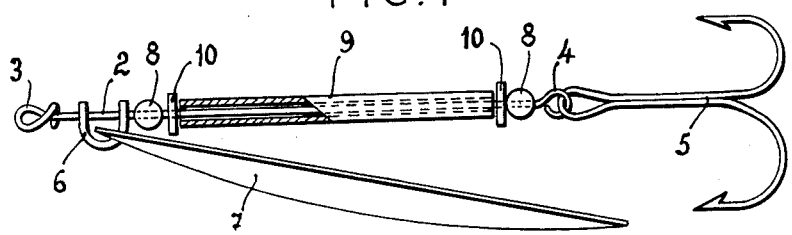
FIGURES 1 and 2 are plan views from above of two embodiments in the case of a spoon.

The spoon illustrated in FIGURE 1 comprises, as is known per se, a metal rod 2 at the ends of which two eyes, 3 and 4 respectively, are used, one for securing the line, the other for securing the hook 5. On said rod 2 are slidingly mounted, as is also known per se, a stirrup 6 to which is linked the blade 7, and at least one ball 8 or the like member.

According to the invention, a sheath 9 is freely mounted on said rod 2, with longitudinal and transverse clearances, said sheath 9 being made of a flexible and resilient material such as, for example, rubber. The sheath 9 is placed between two washers 10 which are in turn located between the two balls 8 next to the stirrup 6 on one side and to the eye 4 for the hook 5 on the other side.

In normal operation, the various movable members on the rod 2 of the lure are able only to travel a few millimeters in a longitudinal direction under the action of the water pressure. When, however, a fish catches the whole lure in its mouth, it blocks the movable members, that is, the blade 7, the stirrup 6, the balls 8.

The pull exerted by the angler on the line, and thus by the rod 2 on the hook 5, does not cause the aforesaid movable members to move since they are blocked in the mouth of the fish, but it causes the sheath 9 to be compressed longitudinally, which makes is possible, as a matter of fact, to pull at the hook 5 without said traction compelling the lure parts blocked by the fish to move in the same way. Thus a very efficient striking of the fish is obtained.

Figure 2:
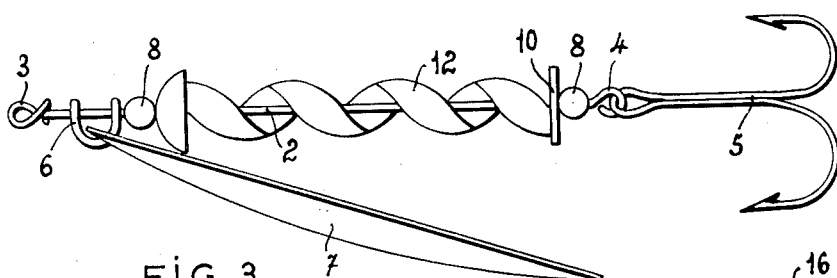

The spoon illustrated in FIGURE 2 is similar to that shown in FIGURE 1, except that a helical spring 12 made of metal or plastic material is substituted for the sheath 9.

Figure 3:
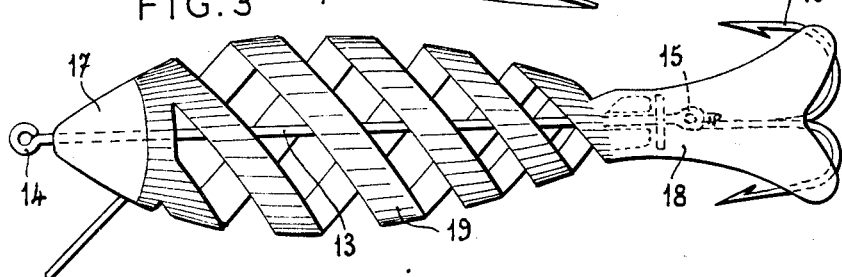
FIGURES 3 and 4 are side-views of two embodiments in the case of an artificial fish.

The lure illustrated in FIGURE 3 simulates an artificial fish. It comprises a rod 13 having at one end an eye 14 for securing said fish to the line and at the other end an eye 15 to which a hook 16 is secured; on said rod 13 a body simulating a fish is mounted, which body includes a head 17 movably mounted on the rod 13, a tail 18 forming one piece with the rod 13 and the hook 16, and a middle portion made of several resilient strips 19 helically arranged and shaped in a manner such that they look like a fish body. Owing to said shape and arrangement, it will be seen that said portion may be compressed not only transversely but principally longitudinally. As a result, when a fish catches the lure body, the pull exerted by the line and by the rod 13 on the hook 16 makes it possible for said hook to move in a longitudinal direction and to penetrate into the fish flesh, while the body 17-18-19 remains unmoved inside the fish mouth.

Figure 4:
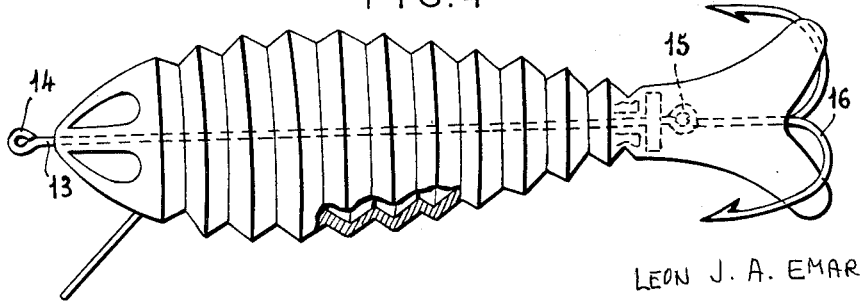

The artificial fish illustrated in FIGURE 4 is different from that of FIGURE 3 only in that its body has a concertina-like outline which, taking into account the resilient material used for making said body, allows it being compressed in a longitudinal direction. Of course, holes may be provided in said body to discharge the water contained therein when said body is compressed as a result, on the one hand, of the fish gripping it and, on the other hand, of the pull exerted by the line.

In the case of the two artificial fishes illustrated in FIGURES 3 and 4, the three parts, i.e., the head, the body and the tail, constitute one piece only. Said parts could, however, be independent and made either of the same material or of different materials. Thus the head could be made of flexible material or of hard material, that is, for instance, of plastic material or of metal, while the body must be constituted in a manner such as to offer some elasticity at least in a longitudinal direction. Said elasticity is such that the body of the arificial fish is not distorted or else is distorted only very slightly under the action of the water pressure during the fishing operation, but is distorted sufficiently in a longitudinal direction under the action of the traction on the line so as to allow the hook moving forward and penetrating into the fish flesh.

Obviously, the invention is not limited to the sole embodiments thereof described hereinabove by way of examples; it covers, on the contrary, all the modifications thereof relating to the constituent material of the various parts constituting the lure, to the number of said parts, to the number of hooks and to the various attachments with which the lure might be equipped, such as flaps, deflectors, counterpoises, etc.

What I claim is:

A fishing lure comprising a longitudinally extending rod having a pair of opposite extremities formed with respective eyes, one of said eyes being connectible to a fishing line; at least one hook swingably mounted in the other of said eyes; a stirrup rotatably engaging said rod and axially shiftable thereon adjacent said one of said eyes; a spoon swingably mounted on said stirrup for swivel movement therewith about said rod; a single cylindrical tube of an elastomeric material surrounding said rod with radial clearance over at least the major portion of the length thereof while being axially compressible thereon; first abutment means between said stirrup and said tube axially shiftable along said rod; and second abutment means between said other eye and said tube, each of said abutment means including a washer member abutting said tube and a ball member bearing on the respective washer member remote from said tube whereby said tube is compressed between said washer members upon tensioning of said line and immobilization of said spoon in the mouth of a fish to shift said hook toward said stirrup and strike the fish.

References Cited by the Examiner

UNITED STATES PATENTS

| | | | |
|---|---|---|---|
| 676,521 | 6/1901 | Weiss | 43—42.19 |
| 890,549 | 6/1908 | Zamel | 43—42.37 X |
| 1,967,089 | 7/1934 | Hick | 43—42.19 |
| 2,450,988 | 10/1948 | Putnam et al. | 43—42.37 X |
| 2,912,784 | 11/1959 | Carlin | 43—42.24 X |
| 3,133,371 | 5/1964 | Christensen | 43—42.37 X |

SAMUEL KOREN, *Primary Examiner.*

ABRAHAM G. STONE, *Examiner.*